US011629796B2

(12) United States Patent
Vyers (10) Patent No.: US 11,629,796 B2
(45) Date of Patent: Apr. 18, 2023

(54) VACUUM VALVE AND ACTUATOR USED IN VACUUM VALVE

(71) Applicant: SUMITOMO HEAVY INDUSTRIES, LTD., Tokyo (JP)

(72) Inventor: Emmanuel Vyers, Singapore (SG)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/545,685

(22) Filed: Dec. 8, 2021

(65) Prior Publication Data

US 2022/0099218 A1 Mar. 31, 2022

Related U.S. Application Data

(63) Continuation of application No. PCT/JP2020/022412, filed on Jun. 5, 2020.

(30) Foreign Application Priority Data

Jun. 12, 2019 (JP) .............................. JP2019-109400

(51) Int. Cl.
*F16K 51/02* (2006.01)
*F16K 3/02* (2006.01)
(Continued)

(52) U.S. Cl.
CPC ............ *F16K 51/02* (2013.01); *F16K 3/0218* (2013.01); *F16K 3/184* (2013.01); *F16K 31/043* (2013.01);
(Continued)

(58) Field of Classification Search
CPC ...... F16K 51/02; F16K 3/0218; F16K 31/047; F16K 31/508; F16K 41/10; F16K 49/002; F16K 31/043
See application file for complete search history.

(56) References Cited

U.S. PATENT DOCUMENTS 5,560,586 A * 10/1996 Aruga ..................... F16K 31/04
251/266
6,227,236 B1 * 5/2001 Kusumoto ............ F16K 49/002
118/620
(Continued)

FOREIGN PATENT DOCUMENTS

JP H08-042734 A 2/1996
JP 2005-061437 A 3/2005
(Continued)

OTHER PUBLICATIONS

International Search Report issued in Application No. PCT/JP2020/022412, dated Aug. 25, 2020.
(Continued)

*Primary Examiner* — David Colon-Morales
(74) *Attorney, Agent, or Firm* — Michael Best & Friedrich LLP (57) ABSTRACT

A vacuum valve includes a valve plate that covers an exhaust port of a vacuum chamber, and a poppet type actuator that drives the valve plate in an axial direction orthogonal to a surface of the vacuum chamber on which the exhaust port is provided. The actuator includes a shaft that is connected to the valve plate, a drive unit that is disposed side by side with the shaft in a radial direction of the shaft and includes a ball screw shaft and a drive source that rotates the ball screw shaft, and a connection part that connects the ball screw shaft and the shaft and moves in the axial direction together with the shaft to a position where the valve plate covers the exhaust port.

15 Claims, 6 Drawing Sheets

(51) Int. Cl.
 *F16K 41/10* (2006.01)
 *F16K 49/00* (2006.01)
 *F16K 31/50* (2006.01)
 *F16K 3/18* (2006.01)
 *F16K 31/04* (2006.01)
 *F16K 31/528* (2006.01)

(52) U.S. Cl.
 CPC .......... *F16K 31/047* (2013.01); *F16K 31/508* (2013.01); *F16K 31/5286* (2013.01); *F16K 41/10* (2013.01); *F16K 49/002* (2013.01)

(56) References Cited

U.S. PATENT DOCUMENTS

| | | | |
|---|---|---|---|
| 7,117,886 B2* | 10/2006 | Kajitani | G05D 16/202 251/285 |
| 8,123,195 B2 | 2/2012 | Iwabuchi | |
| 9,091,371 B2* | 7/2015 | Lee | C23C 16/4412 |
| 9,303,788 B2* | 4/2016 | Hara | H01L 21/67201 |
| 9,329,603 B2* | 5/2016 | Watanabe | G05D 16/2086 |
| 10,184,570 B2 | 1/2019 | Bohm et al. | |
| 11,035,488 B2* | 6/2021 | Kozaki | F16K 41/10 |
| 11,268,630 B2* | 3/2022 | Hosek | F16K 3/10 |
| 2011/0041632 A1* | 2/2011 | Baker | B64C 13/341 74/89.21 |
| 2020/0340562 A1 | 10/2020 | Eriksen | |

FOREIGN PATENT DOCUMENTS

| | | |
|---|---|---|
| JP | 2011-158096 A | 8/2011 |
| JP | 2018-509570 A | 4/2018 |
| WO | 2008-047066 A1 | 4/2008 |
| WO | 2019-078727 A1 | 4/2019 |

OTHER PUBLICATIONS

Search Report issued in European Application No. 20821597.0, dated Jul. 29, 2022.

* cited by examiner

VACUUM VALVE AND ACTUATOR USED IN VACUUM VALVE

RELATED APPLICATIONS

The contents of Japanese Patent Application No. 2019-109400, and of International Patent Application No. PCT/JP2020/022412, on the basis of each of which priority benefits are claimed in an accompanying application data sheet, are in their entirety incorporated herein by reference.

BACKGROUND

Technical Field

Certain embodiments of the present invention relate to a vacuum valve and an actuator that is used in a vacuum valve.

Description of Related Art

In the related art, a vacuum valve for controlling a fluid flow between a vacuum chamber and a vacuum pump that adjusts the pressure in the vacuum chamber is known. The vacuum valve includes a valve plate that covers an exhaust port of the vacuum chamber, and an actuator that drives the valve plate. Various improvements have been proposed with respect to the vacuum valve and the actuator of the vacuum valve in order to improve the driving accuracy and driving speed of the valve plate (for example, the related art).

SUMMARY

According to an embodiment of the present invention, there is provided a vacuum valve including: a valve plate that covers an exhaust port of a vacuum chamber; and a poppet type actuator that drives the valve plate in an axial direction orthogonal to a surface of the vacuum chamber on which the exhaust port is provided. The actuator includes a shaft that is connected to the valve plate, a drive unit that is disposed side by side with the shaft in a radial direction of the shaft and includes a ball screw shaft and a drive source that rotates the ball screw shaft, and a connection part that connects the ball screw shaft and the shaft and moves in the axial direction together with the shaft to a position where the valve plate covers the exhaust port.

According to another embodiment of the present invention, there is provided a poppet type valve actuator for a vacuum chamber including: a shaft that drives a valve plate that covers an exhaust port of the vacuum chamber, in an axial direction orthogonal to a surface on which the exhaust port is provided; a drive unit that is disposed side by side with the shaft in a radial direction of the shaft and includes a ball screw shaft and a drive source that rotates the ball screw shaft; and a connection part that connects the ball screw shaft and the shaft and moves in the axial direction together with the shaft.

DETAILED DESCRIPTION

The vacuum pump has relatively large volume, and therefore, for example, in a case where the vacuum pump is installed near the exhaust port of the vacuum chamber, the disposition place of the actuator of the vacuum valve may be restricted. For example, in a poppet type actuator in which a valve plate is driven by moving up and down a lifting and lowering mechanism such as a shaft by a drive source, the length of the actuator in a lifting and lowering direction tends to become long due to a lifting and lowering operation, and the actuator may interfere with the vacuum pump and the accessory equipment of the vacuum pump.

It is desirable to provide a vacuum valve that is difficult to be subjected to restriction of disposition and an actuator that is used in the vacuum valve.

According to the configuration of the embodiment described above, the drive unit and the shaft can be disposed side by side in the radial direction of the shaft, and in this way, the length of the actuator along an axial direction of the shaft can be shortened.

As described above, according to the present invention, it is possible to make it difficult to be subjected to restriction of disposition.

Hereinafter, an embodiment of the present invention will be described. In the following embodiment, there is a case where detailed description is made using three-dimensional Cartesian coordinates including an X-axis, a Y-axis, and a Z-axis. In this case, the X-axis and the Y-axis are taken along a plane (for example, a horizontal plane) on which an exhaust port of a vacuum chamber is provided, and a +Y direction corresponds to a radial direction from the outer periphery of the exhaust port toward the center. A −Y direction corresponds to a radial direction from the center of the exhaust port toward the outer periphery, which is the opposite direction of the +Y direction. Since the X-axis is orthogonal to the Y-axis in the plane, an X direction corresponds to a tangential direction to the exhaust port. The Z-axis is orthogonal to the XY plane. A Z direction may be, for example, a vertical direction. A +Z direction is a direction from a vacuum pump toward the exhaust port. A −Z direction is a direction from the exhaust port toward the vacuum pump, which is the opposite direction of the +Z direction. Further, in the embodiment, there is a case where the Z direction is referred to as an up-down direction. An upward direction coincides with the +Z direction. A downward direction coincides with the −Z direction.

Figure 1:
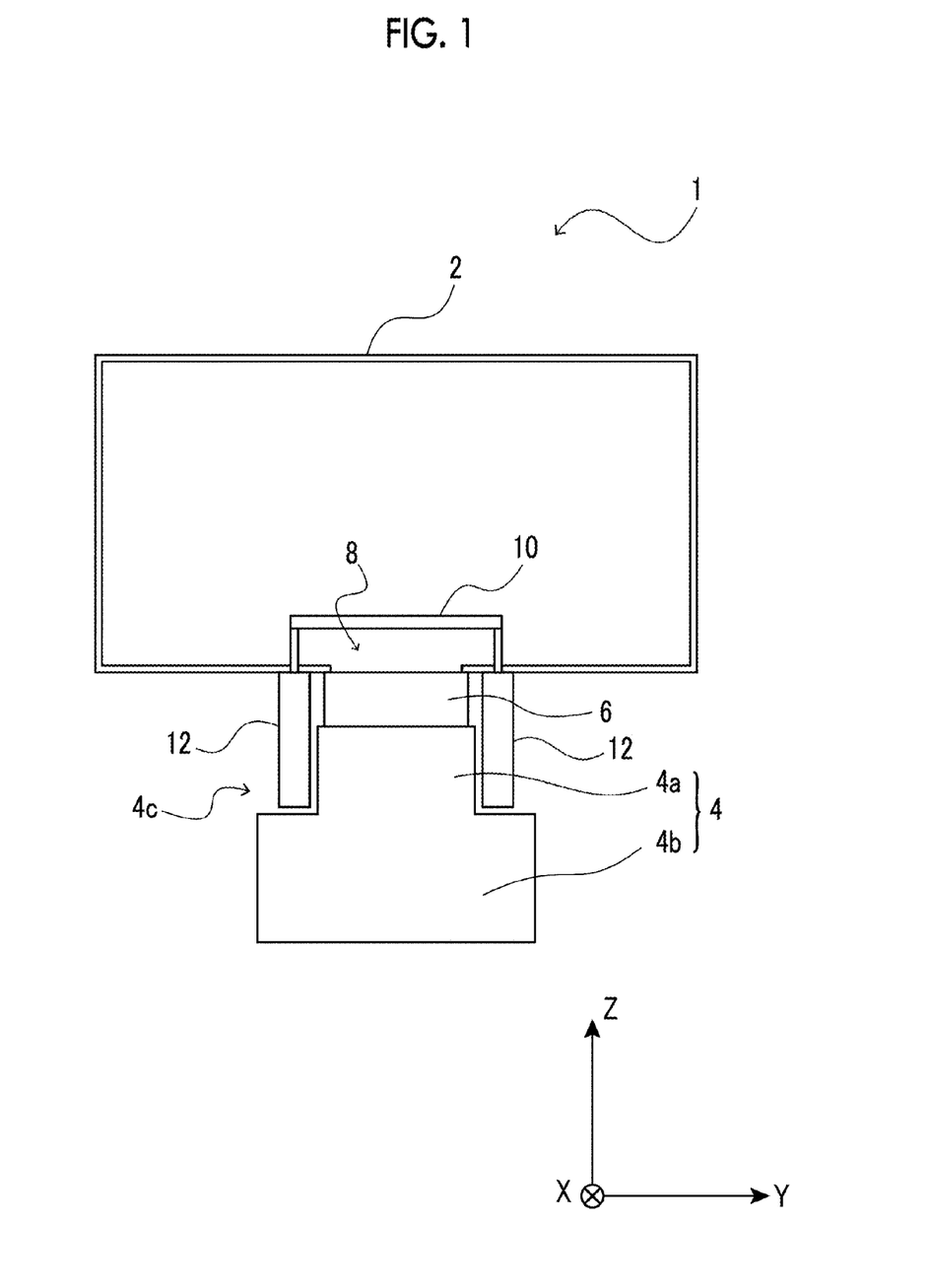
FIG. 1 is a schematic diagram of a vacuum exhaust system that includes a vacuum valve according to the present embodiment.

FIG. 1 is a schematic diagram of a vacuum exhaust system that includes a vacuum valve according to the present embodiment.

As shown in FIG. 1, a vacuum exhaust system 1 is formed by connecting a vacuum chamber 2 and a vacuum pump 4 for exhausting the vacuum chamber 2. The vacuum chamber 2 is used in a manufacturing process for semiconductors, flat panels, or the like. The vacuum chamber 2 is used, for example, when performing etching on a semiconductor substrate disposed inside by using a predetermined process gas and plasma. The vacuum pump 4 is connected to the vacuum chamber 2 through a pipe 6 and an exhaust port 8 of the vacuum chamber 2. When the vacuum pump 4 is driven, the process gas in the vacuum chamber 2 is exhausted through the exhaust port 8. The vacuum pump 4 may be directly mounted to the vacuum chamber 2 without using the pipe 6.

The exhaust port 8 is provided on the surface that is located in the −Z direction of the vacuum chamber 2, and the exhaust port 8 is connected to the pipe 6. Further, a valve plate 10 covering the exhaust port 8 is provided in the vacuum chamber 2. The valve plate 10 is a so-called variable conductance valve capable of adjusting the amount of fluid that is exhausted from the vacuum chamber 2 according to the opening degree. The valve plate 10 is moved along the Z-axis by an actuator 12 provided outside the vacuum chamber 2, and the opening and closing amount thereof is controlled. The valve plate 10 has a size and a shape that cover the exhaust port 8. When the valve plate 10 is closed, the exhaust port 8 is hermetically closed and the pressure in the vacuum chamber 2 can be maintained. Further, when the valve plate 10 is opened by a predetermined amount and the vacuum pump 4 is driven, a negative pressure is generated in the vacuum chamber 2 by the vacuum pump 4, and thus the process gas can be exhausted from the inside of the vacuum chamber 2.

The vacuum pump 4 is provided outside the vacuum chamber 2, for example, on the surface side in the −Z direction of the vacuum chamber 2. The vacuum pump 4 is, for example, a turbo molecular type high-vacuum pump that is widely used in semiconductor manufacturing equipment. The vacuum pump 4 has a wing accommodation portion 4a that is disposed to face the vacuum chamber 2, and a pump main body 4b in which pipes, wires, and the like are accommodated and to which a pipe, a wire, and the like that are connected to an external device are connected.

A pair of actuators 12 for operating the valve plate 10 is mounted to the vacuum chamber 2, and the valve plate 10 and the actuator 12 configure a vacuum valve. The pair of actuators 12 is mounted to the outer surface in the −Z direction of the vacuum chamber 2, and disposed so as to interpose the vacuum pump 4 and the exhaust port 8 of the vacuum chamber 2 therebetween along the Y-axis. The actuator 12 is disposed so as not to interfere with a pipe, a wire, or the like extending from the pump main body 4b of the vacuum pump 4. In a case of mounting the actuator 12 to the vacuum chamber 2, it is necessary to consider the interference between the actuator 12 and the pump main body 4b and the interference between the actuator 12 and the wire or the like of the vacuum pump 4, and there is a case where there is restriction on the disposition. By forming the actuator 12 in a shape having a Z-axis dimension that does not reach the pump main body 4b and/or the pipe, the wire, or the like in the direction along the Z-axis, it is possible to prevent the actuator 12 from interfering with the vacuum pump 4 or the like.

Figure 2:
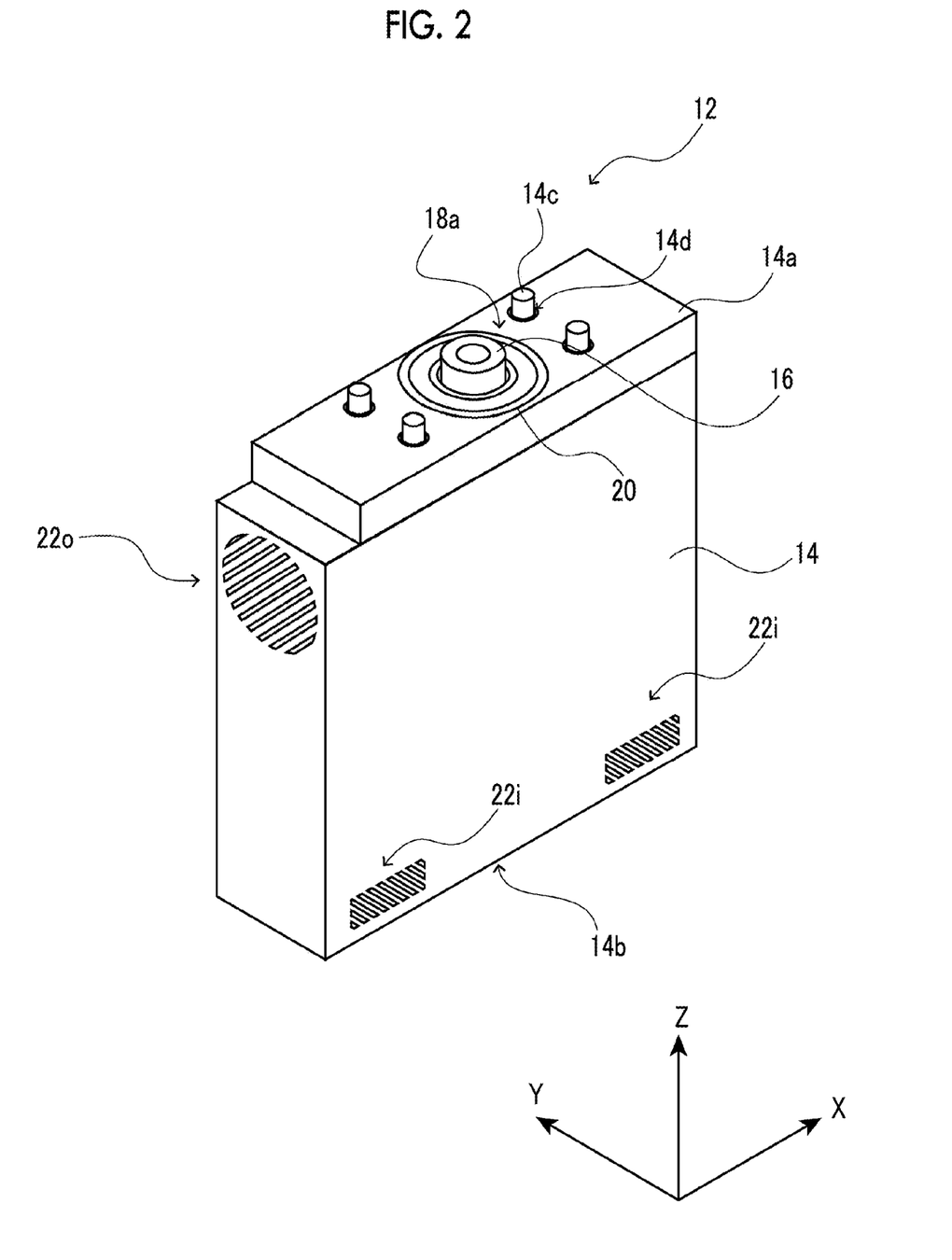
FIG. 2 is a perspective view of the vacuum valve.
Figure 3:
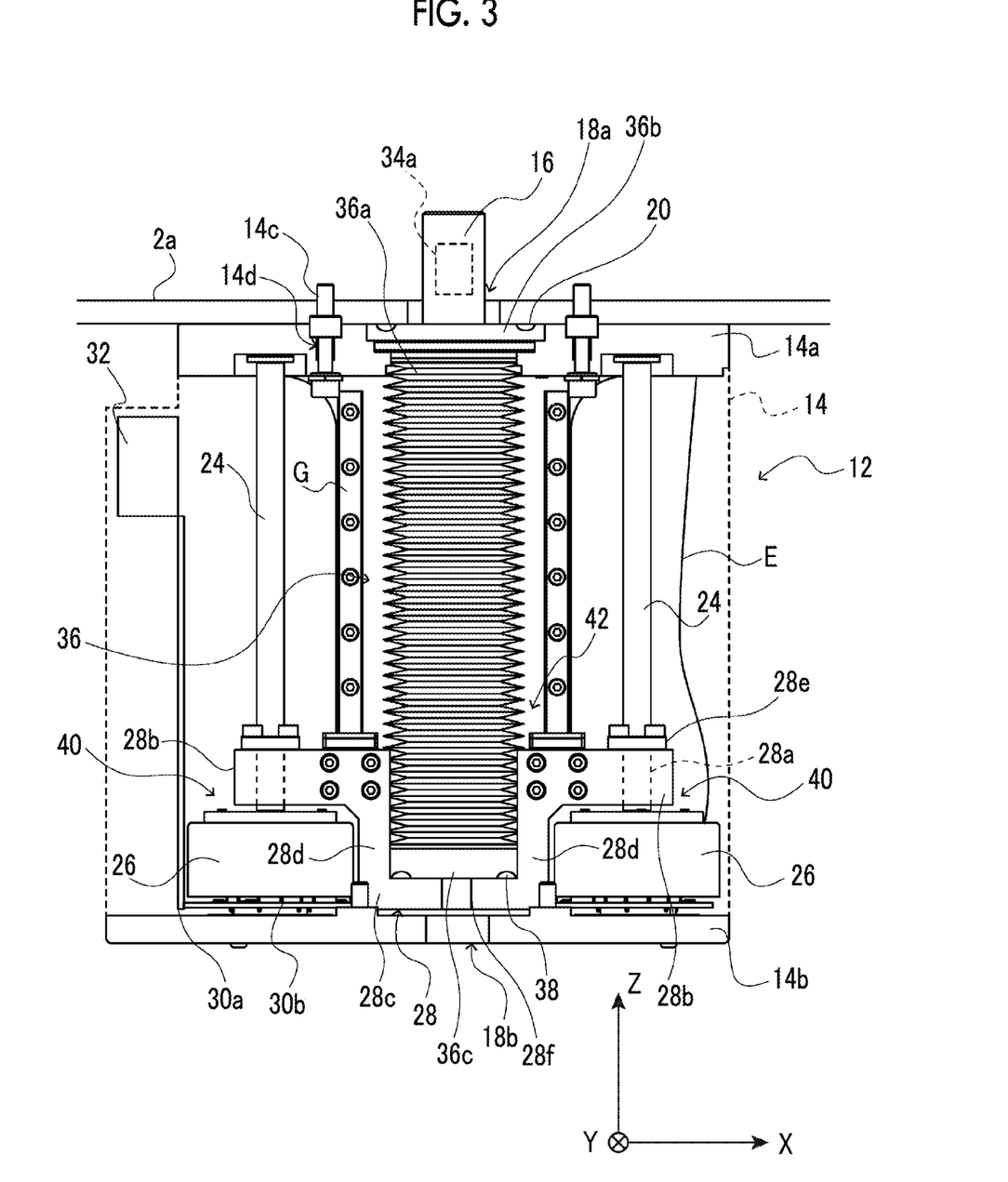
FIG. 3 is a side sectional view of the vacuum valve.
Figure 4:
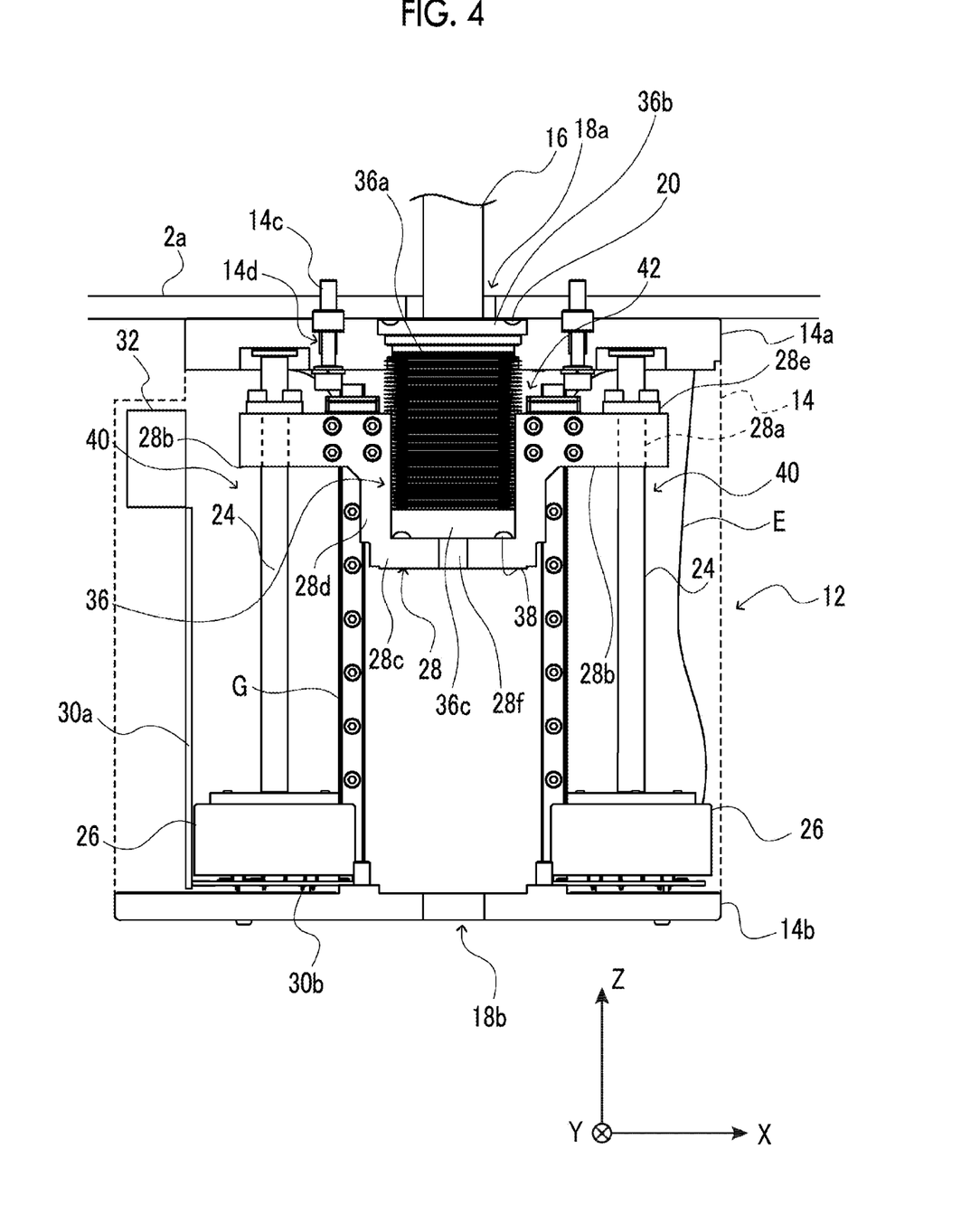
FIG. 4 is a side sectional view of the vacuum valve.

FIG. 2 is a perspective view of the actuator, and FIGS. 3 and 4 are side sectional views of the vacuum valve. FIGS. 3 and 4 are not exact sectional views, and a housing 14 is shown by a broken line in order to make the configuration of the actuator easier to understand, and hatching of the cross section of each part is omitted. Since the pair of actuators 12 has the same mechanical structure, the structure of the actuator 12 will be described in detail below by taking the actuator 12 on one side as an example. Further, in the present embodiment, the opening degree of the valve plate 10 is adjusted by driving the two actuators in synchronization with each other. However, in a case where the valve plate 10 is small, it may be driven by one actuator, and in a case where the valve plate 10 is large, it may be driven by three or more actuators.

The actuator 12 is a so-called poppet type actuator, and is provided with the housing 14, a shaft 16 protruding from the inside of the housing 14 to the outside of the housing 14, and an opening 18a of the housing 14, through which the shaft 16 penetrates. The housing 14 has a rectangular parallelepiped shape. The opening 18a for disposing the shaft 16 that is connected to the valve plate 10 is formed in a housing upper plate 14a that is provided at the end in the +Z direction of the housing 14. Further, a housing lower plate 14b that is provided at the end in the −Z direction of the housing 14 also has an opening 18b formed at substantially the same position as the opening 18a when viewed from the Z direction. The portions other than the housing upper plate 14a of the housing 14 may be formed of resin having no electrical conductivity. The housing upper plate 14a is formed of metal having intensity of a certain level or more and having electrical conductivity.

The housing upper plate 14a is provided at the end portion in the +Z direction of the housing 14, and comes into contact with the outer surface of the vacuum chamber 2 when the actuator 12 is mounted to the vacuum chamber 2. The vicinity of the end portion in the +Z direction of the shaft 16 protrudes from the opening 18a provided in the housing upper plate 14a, to the outside of the housing 14. Further, the opening 18a is also a portion for taking out a bellows (described later) when exchanging the bellows. Further, the housing upper plate 14a is provided with a plurality of through-holes 14d through which a plurality of bolts 14c for fixing the actuator 12 to the vacuum chamber 2 penetrate. The bolt 14c is fitted into a bottom plate 2a provided at the end portion in the −Z direction of the vacuum chamber 2 to fix the actuator 12 to the vacuum chamber 2. When all the bolts 14c are accurately fitted into the bottom plate 2a, the exhaust port 8 formed in the bottom plate 2a of the vacuum chamber 2 and an inflow port (not shown) of the vacuum pump 4 communicate with each other.

An intake port 22i for internal cooling and an exhaust port 22o are provided on the side surface of the housing 14. There is a case where the vacuum chamber 2 or the valve plate 10 is heated by a heater in order to prevent products that are generated during the process from adhering to the vacuum chamber 2. In such a case, it is preferable that the intake port 22i for taking in air for cooling the housing 14 is provided at a position away from the vacuum chamber 2 having a high temperature. In this way, it is possible to prevent the air heated by the vacuum chamber 2 from being taken in from the intake port 22i. In the illustrated example, the intake port 22i is provided near the end on the −Z direction side of the surface facing in the −Y direction of the housing 14, and the exhaust port 22o is provided near the end on the +Z direction side of the surface facing in the −X direction. The intake port 22i may also be provided on the surface in the +Y direction of the housing 14. Further, it is preferable to provide the intake port 22i in the vicinity of a motor (described later) which is relatively easy to generate heat.

The actuator 12 is provided with the shaft 16 that drives the valve plate 10, two ball screw shafts 24 disposed at positions deviated from the shaft 16 in the radial direction of the shaft 16, two motors 26 for rotating the ball screw shafts 24, respectively, and a connection part 28 that connects the shaft 16 and the ball screw shafts 24. In the actuator 12, the shaft 16 is moved along the Z-axis by a drive unit, which includes the two motors 26 and the two ball screw shafts 24, to adjust the opening degree of the valve plate 10. More specifically, in the actuator 12, the two ball screw shafts 24 are rotated at the same time by the two motors 26, respectively. Due to the rotation of each of the ball screw shafts 24, the connection part 28 moves along the Z-axis along the ball screw shaft 24. The shaft 16 fixed to the connection part 28 moves along the Z-axis together with the connection part 28.

Further, the actuator 12 has a built-in control board 30*a* for controlling the operation of the actuator 12, and a built-in cooling fan 32.

The shaft 16 is formed of metal and has a hollow structure. The end in the +Z direction of the shaft 16 is mounted to the valve plate 10, and the end in the −Z direction is fixed to the connection part 28. The shaft 16 has a length that is substantially the same as the length along the Z-axis of the housing 14. The valve plate 10 mounted to the end of the shaft 16 is moved along the Z-axis by moving the shaft 16 along the Z-axis. Due to providing a hollow portion in the shaft 16, for example, a wire of a heater 34*a* for heating the shaft 16 can pass through the inside of the shaft 16. The hollow portion of the shaft 16 may extend from the upper end to the lower end of the shaft 16. The lower end of the shaft 16 may have an opening at a position facing a through-hole 28*f* of the connection part 28 (described later). The hollow portion of the shaft 16 communicates with the external space of a bellows 36 through the through-hole 28*f* of the connection part 28. Therefore, the hollow portion of the shaft 16 has atmospheric pressure. The bellows 36 capable of expanding and contracting along the Z-axis is disposed around the shaft 16.

The bellows 36 configures a moving space for the shaft 16, and the internal space thereof fluidly communicates with the internal space of the vacuum chamber 2 and is fluidly separated from the periphery of the bellows 36 by the bellows 36. The bellows 36 is provided with a bellows-shaped partition wall 36*a* capable of contracting along the Z-axis, an upper flange 36*b* formed at the end in the +Z direction of the partition wall 36*a*, and a lower flange 36*c* formed at the end in the −Z direction of the partition wall 36*a*. The partition wall 36*a* of the bellows 36 separates the internal space of the bellows 36 and the peripheral space of the bellows 36. When the vacuum chamber 2 is operated, the internal space of the bellows 36 has the same pressure as the vacuum chamber 2, and the peripheral space of the bellows 36 has atmospheric pressure. A seal structure 20 that comes into contact with the bottom plate 2*a* is formed on the upper flange 36*b* of the bellows 36. The upper flange 36*b* is hooked on a step formed around the opening 18*a* of the housing upper plate 14*a*. When the housing upper plate 14*a* is fixed to the bottom plate 2*a*, the upper flange 36*b* is interposed and fixed between the step and the bottom plate 2*a*. In that state, the seal structure 20 is crushed between the upper flange 36*b* and the bottom plate 2*a* by pressing the housing upper plate 14*a* against the bottom plate 2*a* with the bolts 14*c*, and seals a gap between the upper flange 36*b* and the bottom plate 2*a*.

The lower flange 36*c* is formed so as to be detachable with respect to the connection part 28. The lower flange 36*c* is provided with a seal structure 38 that comes into contact with the connection part 28, and the lower flange 36*c* and the connection part 28 are fixed to each other by bolts (not shown). The seal structure 38 is crushed between the lower flange 36*c* and the surface in the +Z direction of the connection part 28 by tightening the bolts and seals a gap between the lower flange 36*c* and the connection part 28.

Further, the bellows 36 has a smaller dimension than the opening 18*a* formed in the housing upper plate 14*a* when viewed from the Z direction. Therefore, by removing the bolts that fix the lower flange 36*c* and the connection part 28 to each other, the bellows 36 that includes the partition wall 36*a*, the upper flange 36*b*, and the lower flange 36*c* can be taken out from the housing 14 through the opening 18*a*.

The two ball screw shafts 24 are disposed so as to interpose the shaft 16 therebetween in the X direction when viewed from the +Z direction, and extend parallel to each other along the Z-axis. Further, the two ball screw shafts 24 are held so as to be rotatable around the Z-axis in the housing 14 and so as not to move in any of the ±X, ±Y, and ±Z directions with respect to the housing 14. More specifically, the ends in the +Z direction of the two ball screw shafts 24 are held by the housing upper plate 14*a* so as to be rotatable through bearings or the like, and the ends in the −Z direction are connected to the motors 26. By disposing the two ball screw shafts 24 at positions interposing the shaft 16 therebetween, the ball screw shafts 24 are deviated from the shaft 16 in the radial direction of the shaft 16. Further, the state shown in FIG. 3 shows a state where the shaft 16 has been moved to the most −Z direction side. However, in this state, the two ball screw shafts 24 and the shaft 16 are arranged along the X-axis, and are disposed at almost the same position in the Z direction. In a case where the two ball screw shafts 24 and the shaft 16 are disposed side by side, there is a case where the length along the X-axis of the actuator 12 becomes long. However, inmost cases, the components of the vacuum pump 4 do not interfere with the actuator 12 in the X direction, and therefore, such a disposition does not substantially cause any adverse effect.

A spiral thread is formed on the peripheral surface of the ball screw shaft 24. The thread of the ball screw shaft 24 is coupled with the nut of the connection part 28. The end portion in the +Z direction of the ball screw shaft 24 is held so as to be rotatable with respect to the housing, and the end portion in the −Z direction is directly connected to the motor 26. In the present embodiment, as the ball screw shaft 24, a so-called direct drive type which is directly connected to the motor 26 without using a gear, a belt, or the like is used. In the so-called direct drive type, the ball screw shaft 24 and an output shaft of the motor 26 are arranged in a straight line, and the force that is output from the motor 26 and the force that is input to the ball screw shaft 24 become equal. In the direct drive type, in addition to the structure in which the ball screw shaft 24 and the output shaft of the motor 26 are directly connected, a structure is also included in which a connector that connects the ball screw shaft 24 and the output shaft of the motor 26 so as not to move with respect to one another is interposed between the ball screw shaft 24 and the output shaft of the motor 26. The two ball screw shafts 24 are respectively inserted into through-holes 28*a* provided in the connection part 28.

The two motors 26 are disposed such that a drive shaft of each of the motors 26 is aligned with the axis of the corresponding ball screw shaft 24. More specifically, the two motors 26 are disposed near the end in the −Z direction of the housing 14 so as to interpose the shaft 16 therebetween. The two motors 26 are driven in perfect synchronization with each other, and rotate the corresponding two ball screw shafts 24 at the same acceleration and the same rotational speed.

The connection part 28 extends along the X-axis so as to cross the inside of the housing 14, and moves the shaft 16 and the lower flange 36*c* of the bellows 36 along the Z-axis by the rotation of the two ball screw shafts 24. Further, the actuator 12 is provided with a linear guide G that regulates the movement of the connection part 28 such that the connection part 28 moves along the Z-axis while maintaining the posture parallel to the XY plane. The connection part 28 is formed of a metal material so as to have a crank shape when viewed along the Y-axis. More specifically, the connection part 28 is provided with two ball screw connecting portions 28*b* that are respectively connected to the ball screw shafts 24, a support portion 28*c* that supports the bellows 36 at a position deviated from the ball screw connecting portions 28b in the −Z direction, and two Z-direction connecting portions 28d that extend in the Z direction and connect the two ball screw connecting portions 28b and the support portion 28c. The ball screw connecting portion 28b includes a nut that is coupled with the ball screw shaft 24. The two ball screw connecting portions 28b are formed in the same XY plane and have a plate shape extending in the XY plane. The ball screw connecting portion 28b is provided with the through-hole 28a through which the ball screw shaft 24 penetrates, and a nut 28e that is connected to the ball screw shaft 24. The support portion 28c has a plate shape that extends in the XY plane that is located in the −Z direction with respect to the two ball screw connecting portions 28b. The lower flange 36c of the bellows 36 is fixed to the surface in the +Z direction of the support portion 28c, and a gap between the lower flange 36c and the surface in the +Z direction of the support portion 28c is sealed by the seal structure 38. Further, the shaft 16 is connected to the support portion 28c such that the inside thereof is sealed. For example, a seal member such as an O-ring may be disposed between the inner periphery in the radial direction of the lower flange 36c of the bellows 36 and the outer periphery of the shaft 16. In this way, the hollow portion of the shaft 16 is sealed from the outside of the shaft 16. The support portion 28c is provided with the through-hole 28f that communicates with the hollow portion of the shaft 16, and the hollow portion of the shaft 16 reaches atmospheric pressure through the through-hole 28f. The Z-direction connecting portion 28d connects the end on the shaft 16 side of each of the two ball screw connecting portions 28b and the end on the motor 26 side of the support portion 28c. In this way, the two ball screw connecting portions 28b and the support portion 28c are fixed to each other at positions deviated from each other in the Z direction. The support portion 28c is connected to the ball screw shaft 24 through the nut 28e of the ball screw connecting portion 28b, and when the ball screw shaft 24 rotates, the support portion 28c moves in the ±Z direction along the ball screw shaft 24. At this time, the upper flange 36b of the bellows 36 does not move along the Z-axis, and only the lower flange 36c moves along the Z-axis.

Further, motor accommodation recessed portions 40 as drive source accommodation recessed portions are formed at both ends of the connection part 28, and a bellows accommodation recessed portion 42 is formed in the center of the connection part 28. The motor accommodation recessed portion 40 has a recess shape in which the −Z direction side of the connection part 28 is recessed, and is formed in an area partially surrounded by an L-shape composed of the Z-direction connecting portion 28d and the ball screw connecting portion 28b. The bellows accommodation recessed portion 42 is formed in an area that is partially surrounded by the support portion 28c and the two Z-direction connecting portions 28d. Due to the motor accommodation recessed portion 40, the connection part 28 and the motor 26 do not interfere with each other when the connection part 28 is located on the most −Z direction side (the state in FIG. 3). Further, due to the bellows accommodation recessed portion 42, the connection part 28 and the folded bellows 36 do not interfere with each other when the connection part 28 is located on the most +Z direction side (the state in FIG. 4).

The linear guide G is, for example, a plate-shaped member extending along the Z-axis, and the connection part 28 maintains its posture by the engagement of the linear guide G with a groove (not shown) formed in the connection part 28 so as to extend along the Z-axis.

As long as the connection part 28 is provided with at least one ball screw connecting portion 28b, the support portion 28c formed at the position deviated in the −Z direction from the ball screw connecting portion 28b, and at least one Z-direction connecting portion 28d connecting the ball screw connecting portion 28b and the support portion 28c, the motor accommodation recessed portion 40 and the bellows accommodation recessed portion 42 can be formed. Therefore, even in a case where the actuator 12 is provided with only one motor 26, the structure described above can be realized.

The end in the −Z direction of the bellows 36 and the end in the −Z direction of the shaft 16 are mounted on the surface in the Z direction of the bellows accommodation recessed portion 42. The bellows accommodation recessed portion 42 prevents interference between the folded bellows 36 and the connection part 28, as described above. Further, the end in the −Z direction of the shaft 16 is mounted to the bellows accommodation recessed portion 42, and the shaft 16 is moved along the Z-axis according to the movement of the connection part 28 along the Z-axis. The surface in the −Z direction at the position corresponding to the bellows accommodation recessed portion 42 reaches the vicinity of the end in the −Z direction of the housing 14. In this way, the length along the Z-axis of the actuator 12 becomes substantially the same as the length of the shaft 16.

Further, by disposing a flexible ground wire E between the connection part 28 and the housing upper plate 14a made of metal after the connection part 28 is made of metal, each part made of metal may be made to have the same potential and the shaft 16 made of metal may be prevented from being charged with electricity.

The control board 30a is disposed along the wall surface of the housing 14. More specifically, in the present embodiment, the control board 30a is provided with an arithmetic unit such as a CPU (Central Processing Unit) and a calculation area such as a RAM (Random Access Memory), and is disposed along the side surface on the X direction side of the housing 14. Further, a wire board 30b is disposed along the bottom surface on the −Z direction side of the housing 14 and connects the control board 30a and the motor 26. The cooling fan 32 provided at the position corresponding to the exhaust port 22o of the housing 14 is provided in the vicinity of the control board 30a. The detection result of the pressure in the vacuum chamber 2, or the like, is input to the control board 30a, and the control board 30a calculates the drive amount of the motor 26, based on the input result, and outputs a valve opening signal to the motor 26.

Further, the heater 34a that heats the shaft 16 to prevent adhesion of products that are generated during the process processing may be provided in the hollow portion of the shaft 16. The wire of the heater 34a extends in the −Z direction further than the connection part 28 through the hollow portion of the shaft 16 and the through-hole 28f of the connection part 28, and further extends to the outside of the housing 14 through the opening 18b of the housing lower plate 14b. In this way, the wire of the heater 34a can be connected to the external power supply of the actuator 12.

Figure 5:
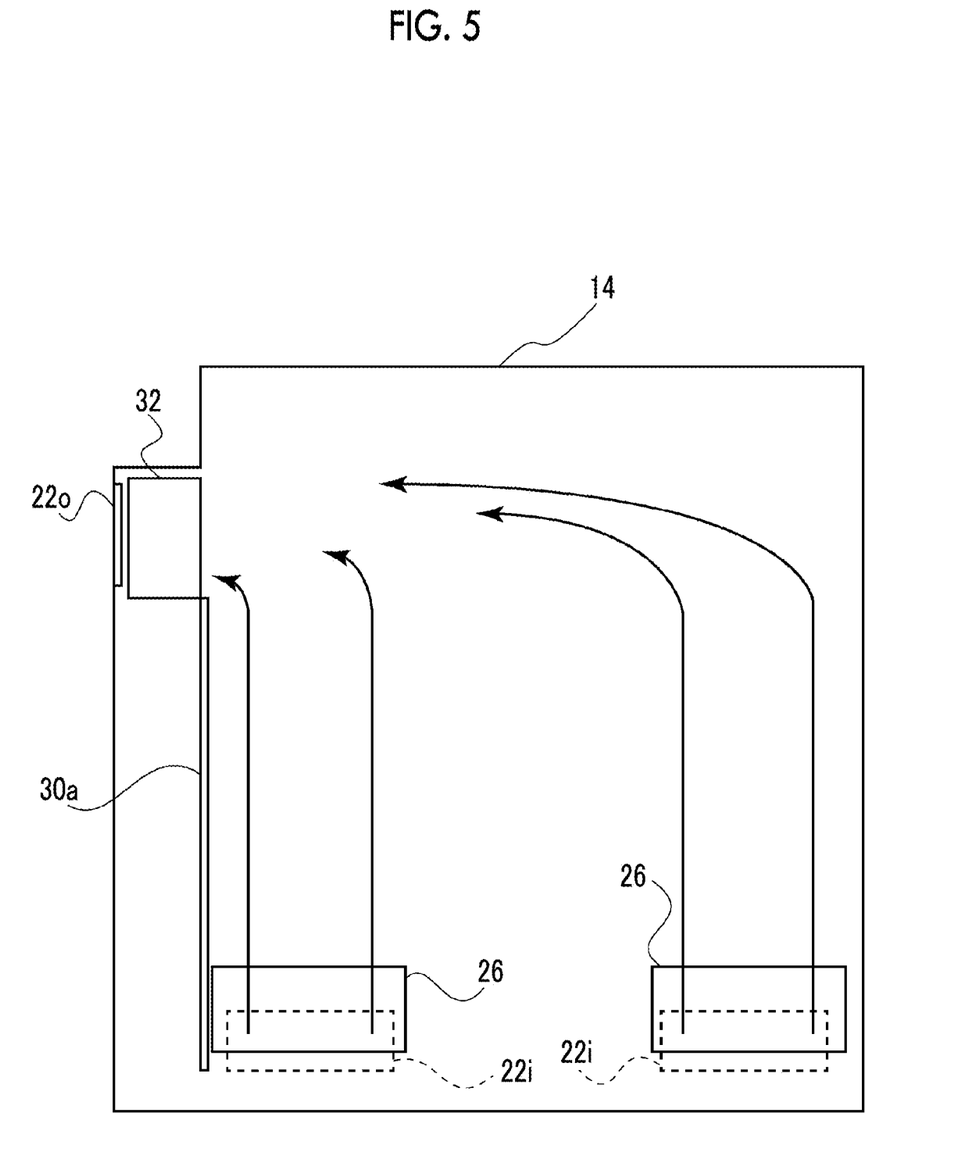
FIG. 5 is a schematic sectional view showing a main part of the vacuum valve.

FIG. 5 is a schematic sectional view showing a main part of the actuator. Since FIG. 5 is a diagram for the purpose of explaining a flow of air in the housing 14, only the components closely related to the flow of air in the actuator 12 are shown, and the other components are omitted. As shown in FIG. 5, air flows into the actuator 12 from the intake port 22i located at a position away from the vacuum chamber 2. The air that has flowed into the actuator 12 from the intake port 22i flows in the direction of the fan 32, that is, in the +Z direction, through the vicinity of the motor 26 that is a heat generation source and the vicinity of the control board 30a. The air that has reached the fan 32 is exhausted to the outside of the housing 14 from the exhaust port 22o.

Next, the operation of the actuator will be described. In a state where the valve plate 10 is closed, the actuator 12 is in the state shown in FIG. 3. In this case, the connection part 28 is located on the most −Z direction side in the housing 14, and holds the posture parallel to the X-axis. In this state, when a valve opening signal is input from the control board 30a to the motor 26, the two motors 26 are rotationally driven by the same amount at the same time. When the two motors 26 are rotationally driven, the ball screw shafts 24 connected to the two motors 26 rotate by the same amount at the same time. In this way, as shown in FIG. 4, the connection part 28 engaged with the ball screw shafts 24 moves in the +Z direction by the amount corresponding to the rotation amount of the ball screw shaft 24 along the linear guide G extending along the Z-axis while maintaining the posture parallel to the X-axis. When the connection part 28 moves in the +Z direction, the connection part 28 moves the bellows 36 and the shaft 16 in the +Z direction. In this way, the valve plate 10 moves in the +Z direction. Further, the lower flange 36c is moved in the +Z direction while maintaining the position of the upper flange 36b of the bellows 36, according to the movement in the +Z direction of the connection part 28. In this way, the bellows 36 is folded by the bellows accommodation recessed portion 42 and the housing upper plate 14a. Since the folded bellows 36 shrinks in the bellows accommodation recessed portion 42, it does not hinder the movement of the connection part 28. The connection part 28 moves in the +Z direction, whereby the shaft 16 moves the valve plate 10 in the Z direction, and the exhaust port 8 of the vacuum chamber 2 is opened by the amount corresponding to the valve opening signal. When the shaft 16 is moved in the +Z direction, the shaft 16 protrudes from the housing of the actuator 12 and extends into the vacuum chamber 2. At this time, for example, the shaft 16 may be heated by driving the heater 34a to prevent the products which are generated during the process from adhering to the shaft 16.

In a case of closing the exhaust port 8 of the vacuum chamber 2, the motor 26 is rotated in the opposite direction to the above. When the motor 26 is rotated in the opposite direction, the ball screw shaft 24 rotates around the Z-axis. In this way, the connection part 28 moves in the −Z direction along the linear guide G while maintaining the posture parallel to the X-axis. When the connection part 28 reaches the lowermost portion (the position shown in FIG. 3), the valve plate 10 is completely closed and the vacuum chamber 2 can be sealed.

As described above, according to the actuator 12 of the embodiment, the length along the Z-axis of the actuator 12 can be made substantially the same as the length of the shaft 16. In this way, the length along the Z-axis of the actuator 12 can be shortened. Further, the shaft 16, the ball screw shaft 24, and the motor 26 are not coaxially disposed and are disposed to be deviated from each other in the radial direction of the shaft 16, so that necessary wires can be passed through the shaft 16.

The present invention is not limited to the embodiment described above, and each configuration of the embodiment can be appropriately modified within a scope which does not depart from the gist of the invention stated in the claims.

Figure 6:
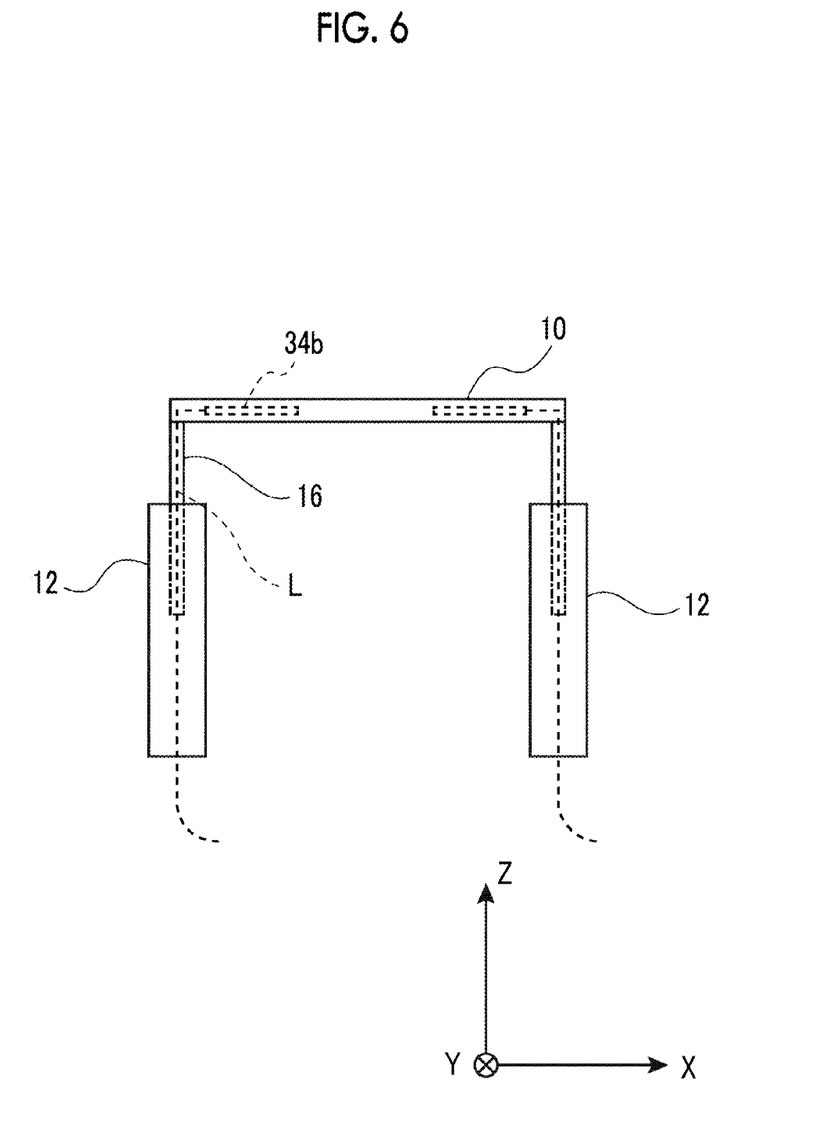
FIG. 6 is a block diagram showing a modification example of the vacuum valve.

FIG. 6 is a block diagram showing a vacuum exhaust system to which a vacuum valve according to a modification example is applied. As shown in FIG. 6, in addition to the heater 34a disposed in the shaft 16, or instead of the heater 34a, a heater 34b may be disposed in the inside of the valve plate 10. Also in this case, a wire L of the heater 34b extends to the outside of the actuator 12 through the inside of the shaft 16. With such a form, it is possible to prevent the products which are generated during the process from adhering to the valve plate 10.

The present invention has industrial applicability in the field of vacuum valves and actuators which are used in the vacuum valves.

It should be understood that the invention is not limited to the above-described embodiment, but may be modified into various forms on the basis of the spirit of the invention. Additionally, the modifications are included in the scope of the invention.

What is claimed is:
1. A vacuum valve comprising:
 a valve plate that covers an exhaust port of a vacuum chamber; and
 a poppet type actuator that drives the valve plate in an axial direction orthogonal to a surface of the vacuum chamber on which the exhaust port is provided,
 wherein the actuator includes
 a shaft that is connected to the valve plate,
 a drive unit that is disposed side by side with the shaft in a radial direction of the shaft and includes a ball screw shaft and a drive source that rotates the ball screw shaft, and
 a connection part that connects the ball screw shaft and the shaft and moves in the axial direction together with the shaft to a position where the valve plate covers the exhaust port.
2. The vacuum valve according to claim 1, wherein the drive source is directly connected to the ball screw shaft.
3. The vacuum valve according to claim 1, further comprising:
 a bellows that surrounds the shaft and is capable of expanding and contracting in an axial direction of the shaft,
 wherein the connection part includes a ball screw connecting portion that is connected to the ball screw shaft, and a support portion that supports the bellows at a position in a direction separated from the exhaust port of the vacuum chamber along the axial direction from the ball screw connecting portion.
4. The vacuum valve according to claim 3, further comprising:
 a housing upper plate provided so as to face the valve plate; and
 an opening portion provided in the housing upper plate to communicate with a hollow space in which the bellows is accommodated,
 wherein a diameter of the opening portion is larger than a diameter of the bellows.
5. The vacuum valve according to claim 3, wherein the shaft includes a hollow structure,
 a lower flange provided at a lower side of the bellows and the support portion are fixed to each other in a sealed manner,
 a hollow portion of the shaft is fixed to the support portion so as to be sealed from an outside of the shaft, and
 the support portion includes a through-hole at a position facing an end portion of the shaft.
6. The vacuum valve according to claim 1, wherein the connection part includes a drive source accommodation recessed portion that accommodates the drive source.

7. The vacuum valve according to claim 1, wherein a plurality of the drive sources are provided.

8. The vacuum valve according to claim 7, wherein another ball screw shaft and another drive source that rotates the another ball screw shaft is provided, and the two ball screw shafts are disposed so as to interpose the shaft therebetween in a tangential direction to the exhaust port at positions deviated from the shaft in the radial direction of the shaft.

9. The vacuum valve according to claim 1, wherein the shaft has a hollow structure.

10. The vacuum valve according to claim 9, further comprising:
a shaft heating unit that heats the shaft,
wherein a power supply cable of the shaft heating unit passes through a hollow portion of the shaft.

11. The vacuum valve according to claim 9, further comprising:
a plate heating unit that heats the valve plate,
wherein a power supply cable of the plate heating unit passes through a hollow portion of the shaft.

12. The vacuum valve according to claim 1, wherein the vacuum chamber is connected to a vacuum pump that is disposed at a position separated from the exhaust port of the vacuum chamber along the axial direction, through the exhaust port.

13. The vacuum valve according to claim 1, wherein a pair of actuators are provided, and
the pair of actuators are disposed so as to interpose the exhaust port therebetween along a radial direction perpendicular to a tangential direction of the exhaust port.

14. The vacuum valve according to claim 1, wherein the actuator includes a housing having an intake port and an exhaust port, and the intake port is provided at a position farther than the exhaust port from the vacuum chamber in the axial direction.

15. A poppet type valve actuator for a vacuum chamber, comprising:
a shaft that drives a valve plate that covers an exhaust port of the vacuum chamber, in an axial direction orthogonal to a surface on which the exhaust port is provided;
a drive unit that is disposed side by side with the shaft in a radial direction of the shaft and includes a ball screw shaft and a drive source that rotates the ball screw shaft; and
a connection part that connects the ball screw shaft and the shaft and moves in the axial direction together with the shaft.

* * * * *